(12) United States Patent
Xu

(10) Patent No.: US 9,774,730 B2
(45) Date of Patent: Sep. 26, 2017

(54) METHOD, DEVICE, AND SYSTEM FOR TELEPHONE INTERACTION

(71) Applicant: Xiaomi Inc., Beijing (CN)

(72) Inventor: Ruijun Xu, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/718,486

(22) Filed: May 21, 2015

(65) Prior Publication Data

US 2016/0094711 A1 Mar. 31, 2016

Related U.S. Application Data

(63) Continuation of application No. PCT/CN2015/074525, filed on Mar. 18, 2015.

(30) Foreign Application Priority Data

Sep. 26, 2014 (CN) .......................... 2014 1 0505750

(51) Int. Cl.
| | |
|---|---|
| *H04M 3/42* | (2006.01) |
| *H04L 12/66* | (2006.01) |
| *H04M 3/00* | (2006.01) |
| *H04M 5/00* | (2006.01) |
| *H04M 3/428* | (2006.01) |

(Continued)

(52) U.S. Cl.
CPC ..... *H04M 3/4285* (2013.01); *H04M 3/42017* (2013.01); *H04M 3/42161* (2013.01); *H04M 3/5191* (2013.01); *H04M 7/0027* (2013.01)

(58) Field of Classification Search
CPC ......... H04M 2203/2011; H04M 3/428; H04M 3/4285; H04M 3/523; H04M 3/5183

USPC ............ 379/207.05, 266.01, 201.01, 265.05, 379/201.05; 370/352, 353; 455/426.1
See application file for complete search history.

(56) References Cited

U.S. PATENT DOCUMENTS

| | | | | |
|---|---|---|---|---|
| 5,535,270 | A * | 7/1996 | Doremus | H04M 3/523 379/245 |
| 6,526,041 | B1 * | 2/2003 | Shaffer | H04L 29/06 370/352 |

(Continued)

FOREIGN PATENT DOCUMENTS

| | | |
|---|---|---|
| CN | 1335015 A | 2/2002 |
| CN | 1366244 A | 8/2002 |

(Continued)

OTHER PUBLICATIONS

International Search Report of PCT Application No. PCT/CN2015/074525, mailed Jun. 26, 2015, issued by the State Intellectual Property Office of P.R. China as ISA (4 pages).

(Continued)

*Primary Examiner* — Thjuan K Addy
(74) *Attorney, Agent, or Firm* — Finnegan, Henderson, Farabow, Garrett & Dunner LLP

(57) ABSTRACT

A method for telephone interaction includes establishing a voice channel for voice calls with a telephone agent system, establishing a data channel with the telephone agent system if the telephone agent system is in a busy state, and acquiring information provided by the telephone agent system via the data channel. The information is associated with an entertainment service. The method further includes providing the entertainment service to a user based on the information.

12 Claims, 15 Drawing Sheets

(51) Int. Cl.
*H04M 3/51* (2006.01)
*H04M 7/00* (2006.01)

(56) References Cited

U.S. PATENT DOCUMENTS

| | | | |
|---|---|---|---|
| 6,870,925 B2 * | 3/2005 | Culp | H04M 3/51 370/352 |
| 8,259,709 B2 * | 9/2012 | Skog | H04L 29/06027 370/353 |
| 2002/0133518 A1 | 9/2002 | Landsman et al. | |
| 2004/0264438 A1 * | 12/2004 | Oldham | H04L 29/06027 370/352 |
| 2006/0188087 A1 * | 8/2006 | Kortum | H04M 3/428 379/266.01 |
| 2006/0198505 A1 | 9/2006 | Kortum et al. | |
| 2008/0101554 A1 | 5/2008 | Rhee et al. | |
| 2008/0260138 A1 | 10/2008 | Chen et al. | |
| 2008/0311903 A1 * | 12/2008 | Levin | H04L 65/1006 455/426.1 |
| 2009/0010247 A1 * | 1/2009 | Stille | H04L 29/06027 370/352 |
| 2013/0343532 A1 | 12/2013 | Castle | |

FOREIGN PATENT DOCUMENTS

| | | |
|---|---|---|
| CN | 101146156 A | 3/2008 |
| CN | 101150419 A | 3/2008 |
| CN | 101222549 A | 7/2008 |
| CN | 101227532 A | 7/2008 |
| CN | 101958979 A | 1/2011 |
| CN | 102170614 A | 8/2011 |
| CN | 102223454 A | 10/2011 |
| CN | 102480504 A | 5/2012 |
| CN | 102780773 A | 11/2012 |
| CN | 103795875 A | 5/2014 |
| CN | 104301556 A | 1/2015 |
| EP | 1 091 548 A2 | 4/2001 |
| JP | 11-242588 A | 9/1999 |
| JP | 2005-346190 A | 12/2005 |
| JP | 2008-252909 A | 10/2008 |
| JP | 2009-250715 A | 10/2009 |
| JP | 2011-061410 A | 3/2011 |
| JP | 2011-172150 A | 9/2011 |
| JP | 2011-234301 A | 11/2011 |
| JP | 2013-152555 A | 8/2013 |
| RU | 2483440 C2 | 5/2013 |
| RU | 2500082 C2 | 11/2013 |
| WO | WO 2007/056310 A2 | 5/2007 |

OTHER PUBLICATIONS

Extended European Search Report of European Application No. 15185454.4, dated Feb. 8, 2016, issued by European Patent Office (8 pages).

English translation of International Search Report of International Application No. PCT/2015/074525, issued by the State Intellectual Property Office of the P.R. China as the ISA, dated Jun. 26, 2015 (2 pages).

Substantive Examination Report mailed on Jan. 13, 2017, in counterpart Russian Application No. 2015125632/07(039906) and English translation thereof.

* cited by examiner

METHOD, DEVICE, AND SYSTEM FOR TELEPHONE INTERACTION

The present application is a continuation of International Application No. PCT/CN2015/074525, filed Mar. 18, 2015, which is based upon and claims priority to Chinese Patent Application No. 201410505750.4, filed Sep. 26, 2014, the entire contents of both of which are incorporated herein by reference.

TECHNICAL FIELD

The present disclosure relates to call answering systems and, more particularly, to a method, device, and system for telephone interaction.

BACKGROUND

A telephone agent system is a call answering system that needs participation of customer service representatives. Enterprise users typically employ telephone agent systems to provide services such as business consultation, business handling, and customer survey.

Sometimes, a telephone agent system may not have enough customer service representatives to answer user terminals dialing in the telephone agent system, and a user terminal needs to wait, i.e., the telephone agent system is in a busy state. In the call waiting period, the telephone agent system usually plays a piece of music for the user terminal. When a customer service representative becomes available to answer the call, the telephone agent system connects the user terminal with the terminal used by the customer service representative for the customer service representative to proceed with providing related services.

SUMMARY

In accordance with the present disclosure, there is provided a method for telephone interaction. The method includes establishing a voice channel for voice calls with a telephone agent system, establishing a data channel with the telephone agent system if the telephone agent system is in a busy state, and acquiring information provided by the telephone agent system via the data channel. The information is associated with an entertainment service. The method further includes providing the entertainment service to a user based on the information.

Also in accordance with the present disclosure, there is provided a method for a telephone agent system to perform a telephone interaction with a user terminal. The method includes establishing a voice channel for voice calls with the user terminal, detecting whether the telephone agent system is in a busy state, establishing a data channel with the user terminal if the telephone agent system is in the busy state, and providing information to the user terminal via the data channel. The information is associated with an entertainment service to be provided by the user terminal to a user.

Also in accordance with the present disclosure, there is provided a device for telephone interaction. The device includes a processor and a non-transitory computer-readable storage medium storing instructions. The instructions, when executed by the processor, cause the processor to establish a voice channel for voice calls with a telephone agent system, establish a data channel with the telephone agent system if the telephone agent system is in a busy state, and acquire information provided by the telephone agent system via the data channel. The information is associated with an entertainment service. The instructions further cause the processor to provide the entertainment service to a user based on the information.

Also in accordance with the present disclosure, there is provided a device for telephone interaction, comprising: a processor; a non-transitory computer-readable storage medium storing instructions that, when executed by the processor, cause the processor to establish a voice channel for voice calls with the user terminal, detect whether the telephone agent system is in a busy state, establish a data channel with the user terminal if the telephone agent system is in the busy state, and provide information to the user terminal via the data channel. The information is associated with an entertainment service to be provided by the user terminal to a user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art with reference to particular embodiments.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects associated to the invention as recited in the appended claims.

In the present disclosure, unless otherwise specified, "voice channel" refers to a voice channel established in a circuit switched ("CS") domain for telephone voice services and "data channel" refers to a channel established in a packet switched ("PS") domain or in the Internet for data transmission services.

Figure 1A:
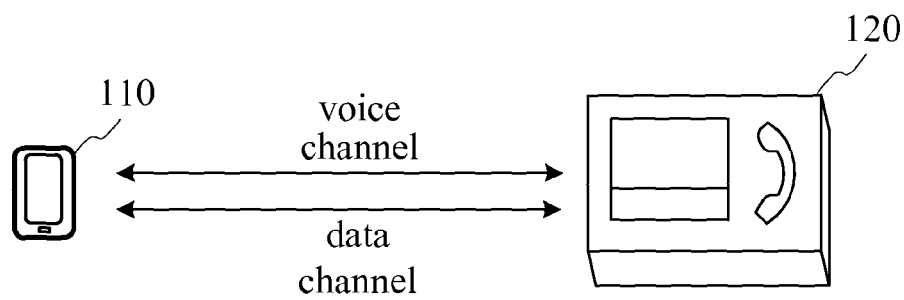
FIGS. 1A and 1B are block diagrams of implementation environments for methods for telephone interaction according to exemplary embodiments.

FIG. 1A shows a block diagram of an exemplary implementation environment of a method for telephone interaction consistent with embodiments of the present disclosure. The implementation environment includes a user terminal 110 and a telephone agent system 120. The user terminal 110 is an electronic device capable of establishing a data channel when making voice calls. For example, the user terminal 110 is a smart phone, a tablet PC having the function of a telephone, etc. The telephone agent system 120 is an electronic device capable of establishing a data channel when making voice calls. A voice channel and a data channel can be established between the user terminal 110 and the telephone agent system 120.

Figure 1B:
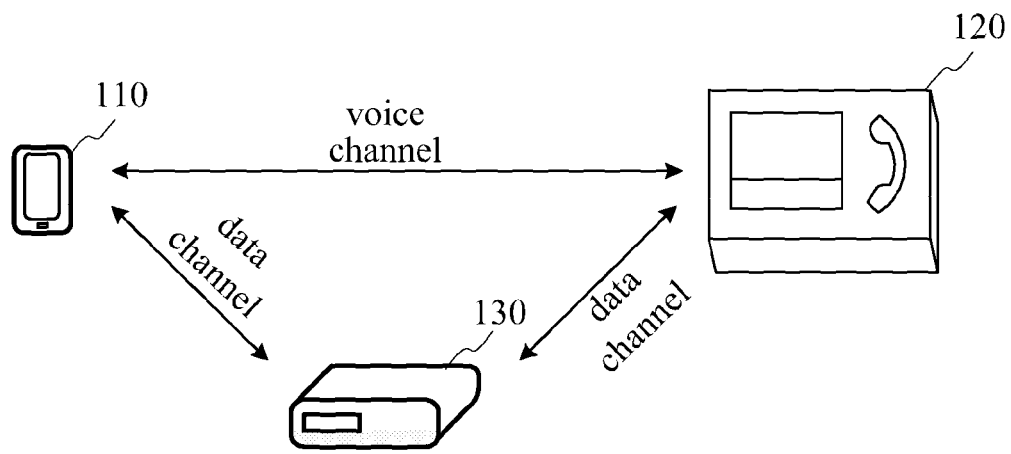

FIG. 1B shows a block diagram of another exemplary implementation environment of a method for telephone interaction consistent with embodiments of the present disclosure. The implementation environment shown in FIG. 1B is similar to that shown in FIG. 1A, but additionally includes a third-party service platform 130, which may be a server, a server cluster including a plurality of servers, or a cloud computing service center. A voice channel can be directly established between the user terminal 110 and the telephone agent system 120, and a data channel can be established by the third-party service platform 130 between the user terminal 110 and the telephone agent system 120.

Figure 2:
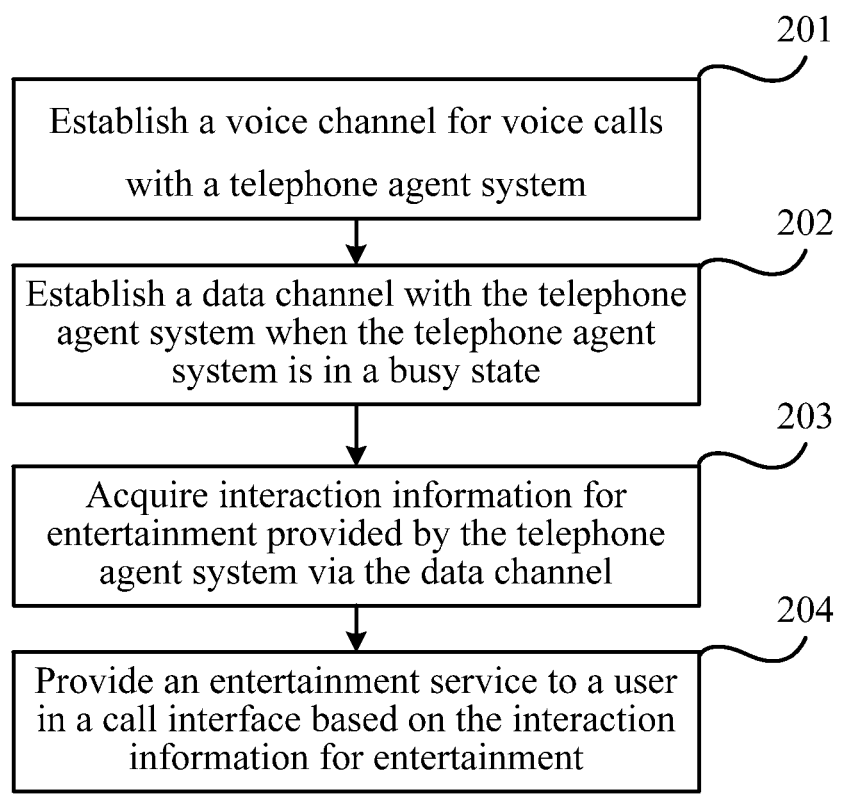
FIG. 2 is a flow chart of a method for telephone interaction according to an exemplary embodiment.

FIG. 2 shows a flow chart of an exemplary method for telephone interaction consistent with embodiments of the present disclosure. The method shown in FIG. 2 can be implemented in the user terminal 110 shown in FIG. 1A, which is operated by a user. As shown in FIG. 2, at 201, a voice channel for voice calls is established with a telephone agent system. At 202, a data channel is established with the telephone agent system when the telephone agent system is in a busy state. At 203, entertainment interaction information provided by the telephone agent system is acquired via the data channel. At 204, an entertainment service is provided to the user in a call interface based on the entertainment interaction information.

Figure 3:
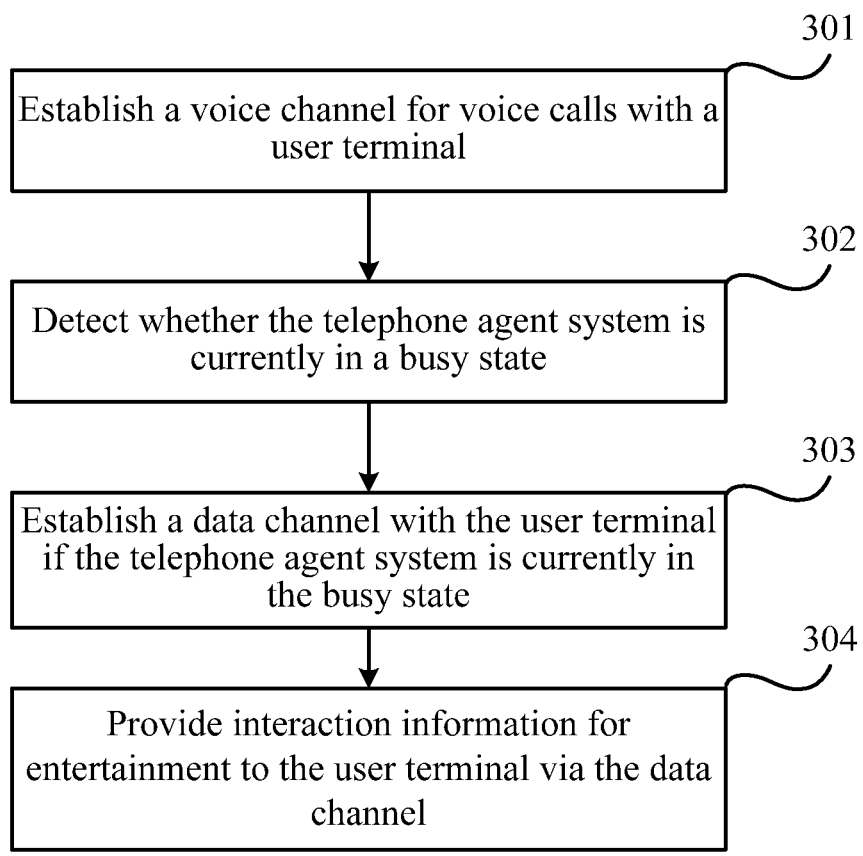
FIG. 3 is a flow chart of a method for telephone interaction according to another exemplary embodiment.

FIG. 3 shows a flow chart of another exemplary method for telephone interaction consistent with embodiments of the present disclosure. The method shown in FIG. 3 can be implemented in the telephone agent system 120 shown in FIG. 1A. As shown in FIG. 3, at 301, a voice channel for voice calls is established with a user terminal. At 302, whether the telephone agent system is currently in a busy state is detected. At 303, a data channel is established with the user terminal if the telephone agent system is currently in the busy state. At 304, entertainment interaction information is provided to the user terminal via the data channel. The user terminal is configured to provide an entertainment service to a user in a call interface based on the entertainment interaction information.

Figure 4A:
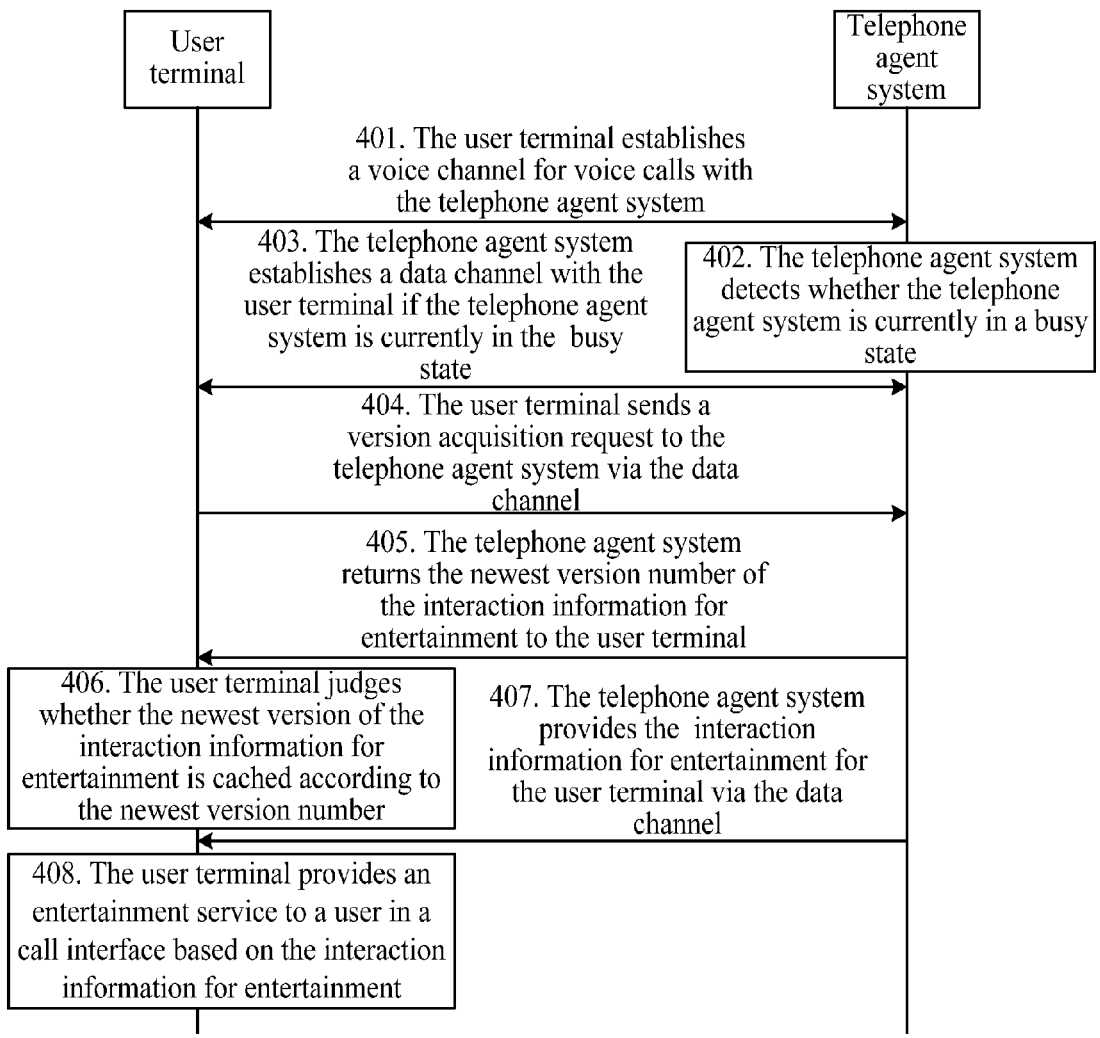
FIG. 4A is a flow chart of a method for telephone interaction according to another exemplary embodiment.

FIG. 4A shows a flow chart of an exemplary method for telephone interaction consistent with embodiments of the present disclosure. The method shown in FIG. 4A can be implemented in, for example, the implementation environment shown in FIG. 1A or 1B. According to this method, a telephone agent system provides a game service to a user terminal.

As shown in FIG. 4A, at 401, the user terminal establishes a voice channel for voice calls with the telephone agent system. That is, when a user needs a human voice service from the telephone agent system, the user may dial the number of the telephone agent system using the user terminal to establish the voice channel for voice calls with the telephone agent system.

At 402, the telephone agent system detects whether the telephone agent system is currently in a busy state. That is, the telephone agent system detects whether it is currently in a busy state after the voice channel with the user terminal is established. The busy state may refer to a state in which no customer service representative is currently available, i.e., the telephone agent system detects whether there is currently an available customer service representative. In some embodiments, the telephone agent system detects whether it is in the busy state after every predetermined time period, so that it can provide the human voice service to the user terminal in time.

At 403, the telephone agent system establishes a data channel with the user terminal if the telephone agent system is currently in the busy state. That is, when the telephone agent system is in the busy state, the telephone agent system establishes a data channel with the user terminal for providing an entertainment service to the user terminal. The entertainment service may be, for example, a game service.

The data channel may be established by various approaches. For example, the user terminal may directly establish the data channel with the telephone agent system. Alternatively, the user terminal may establish the data channel with the telephone agent system via a third-party service platform. The third-party service platform may be configured to record various data generated when each user terminal performs the method for telephone interaction consistent with embodiments of the present disclosure.

In some embodiments, to directly establish the data channel, the telephone agent system sends a data channel establishment request to the user terminal. That is, when the telephone agent system is in the busy state, the telephone agent system sends a data channel establishment request to the user terminal if it needs to provide an entertainment service to the user terminal. When the user terminal receives the data channel establishment request, the user terminal establishes the data channel with the telephone agent system according to the circumstances. Whether the user terminal establishes the data channel with the telephone agent system may be decided by the user. That is, the user may decide whether to accept the entertainment service provided by the telephone agent system.

In some embodiments, to establish the data channel via the third-party service platform, the telephone agent system sends a data channel establishment request to the third-party service platform requesting to establish the data channel with the user terminal. The third-party server sends the data channel establishment request to the corresponding user terminal. When the user terminal receives the data channel establishment request, the user terminal establishes the data channel with the telephone agent system via the third-party service platform according to the circumstances. That is, the telephone agent system establishes a data channel with the third-party service platform, and the user terminal establishes a data channel with the third-party service platform. After these data channels are successfully established, all the data transmitted between the user terminal and the telephone agent system are forwarded by the third-party service platform.

In some embodiments, the user terminal or the telephone agent system chooses how to establish the data channel between the user terminal and the telephone agent system according to the circumstances.

After establishing the data channel with the telephone agent system, the user terminal checks whether it has cached the entertainment interaction information of any version. If so, the process proceeds to 404. If not, the user terminal sends to the telephone agent system an instruction of waiting to receive the entertainment interaction information, and the process proceeds to 407. The entertainment interaction information may be game information.

According to the present disclosure, if the telephone agent system is not in the busy state, then a human voice service is directly provided to the user terminal.

At 404, the user terminal sends a version acquisition request to the telephone agent system via the data channel. That is, if the user terminal has cached the entertainment interaction information of any version, the user terminal may send a version acquisition request to the telephone agent system via the data channel.

At 405, the telephone agent system returns the newest version number of the entertainment interaction information to the user terminal. That is, when receiving the version acquisition request sent by the user terminal, the telephone agent system may return the newest version number of the entertainment interaction information to the user terminal via the data channel.

At 406, the user terminal judges whether it has cached the newest version of the entertainment interaction information according to the newest version number. That is, the user terminal receives the newest version number of the entertainment interaction information returned by the telephone agent system via the data channel and judges whether the newest version of the entertainment interaction information is cached locally according to the newest version number.

If the user terminal does not cache the newest version of the entertainment interaction information, the user terminal acquires the entertainment interaction information provided by the telephone agent system via the data channel. That is, if the entertainment interaction information cached in the user terminal is old entertainment interaction information, then the user terminal may send to the telephone agent system an instruction of waiting for receiving the entertainment interaction information, and the process proceeds to 407.

On the other hand, if the user terminal has cached the newest version of the entertainment interaction information, the user terminal provides the entertainment service to the user in the call interface based on the entertainment interaction information (408 in FIG. 4A).

At 407, the telephone agent system provides the entertainment interaction information to the user terminal via the data channel. Thus, after receiving the instruction of waiting for receiving the entertainment interaction information sent by the user terminal, the telephone agent system may provide the entertainment interaction information to the user terminal. In some embodiments, the entertainment interaction information may be in a webpage form. The user terminal acquires the entertainment interaction information in the webpage form provided by the telephone agent system via the data channel. The webpage form may comply with the HTML5 (Hyper Text Markup Language 5) standard.

According to the present disclosure, the page of the entertainment interaction information can be provided to the user terminal by different approaches, such as Approaches I-III described below.

According to Approach I, the user terminal sends the acquisition request for entertainment interaction information to the telephone agent system via the data channel. This request may be sent by the user terminal automatically, or may be sent by the user terminal under the operation of the user. After receiving the acquisition request, the telephone agent system provides the entertainment interaction information in the webpage form to the user terminal based on the acquisition request.

Because the entertainment interaction information in the webpage form may include one or more pages, the acquisition request for entertainment interaction information may be a request for acquiring all pages of the entertainment interaction information or a request for acquiring one page of the entertainment interaction information. For example, for a web game having multiple levels, the user terminal may first acquire the game page of the first level in the game information. When the first level of the game is cleared, the user terminal may send an acquisition request for acquiring the page corresponding to the second level of the web game to the telephone agent system automatically or after receiving the user's operation instruction. The telephone agent system sends the page corresponding to the second level of the web game to the user terminal after receiving the request.

According to Approach II, the telephone agent system pushes the information acquisition page in the webpage form to the user terminal via the data channel. That is, the telephone agent system directly sends the information acquisition page in the webpage form to the user terminal, and the user terminal receives the information acquisition page in the webpage form. The pushing process may be controlled by a customer service representative of the telephone agent system.

Similarly, because the entertainment interaction information may include one or more pages, the telephone agent system may push all pages of the entertainment interaction information in a single push process or may push one page of the entertainment interaction information in a single push process according to the control of the customer service representative.

Approach III is a combination of Approaches I and II. That is, the user terminal may passively receive the entertainment interaction information pushed by the telephone agent system, or actively send the acquisition request for entertainment interaction information to acquire the entertainment interaction information from the telephone agent system. For example, if the telephone agent system pushes game information of a shooting game to the user terminal, but the user does not like the shooting game, the user can send an acquisition request for game information of a casual-type game to the telephone agent system via the user terminal, and receive the game information of the casual-type game sent by the telephone agent system.

In some embodiments, if the user terminal caches the old entertainment interaction information, then when receiving the newest version of the entertainment interaction information, the user terminal does not receive the part in the newest version of the entertainment interaction information that is the same as that in the old entertainment interaction information, such as, for example, the same picture files and/or audio files. Judgment information regarding the same part may be contained in the newest version number of the entertainment interaction information acquired by the user terminal. Alternatively, the telephone agent system can acquire the version number of the old entertainment interaction information cached in the user terminal, and then send the part in the newest version of the entertainment interaction information that is different from that in the old entertainment interaction information according to the version number. This reduces waste of communication resources and improves efficiency in information acquisition.

Figure 4B:
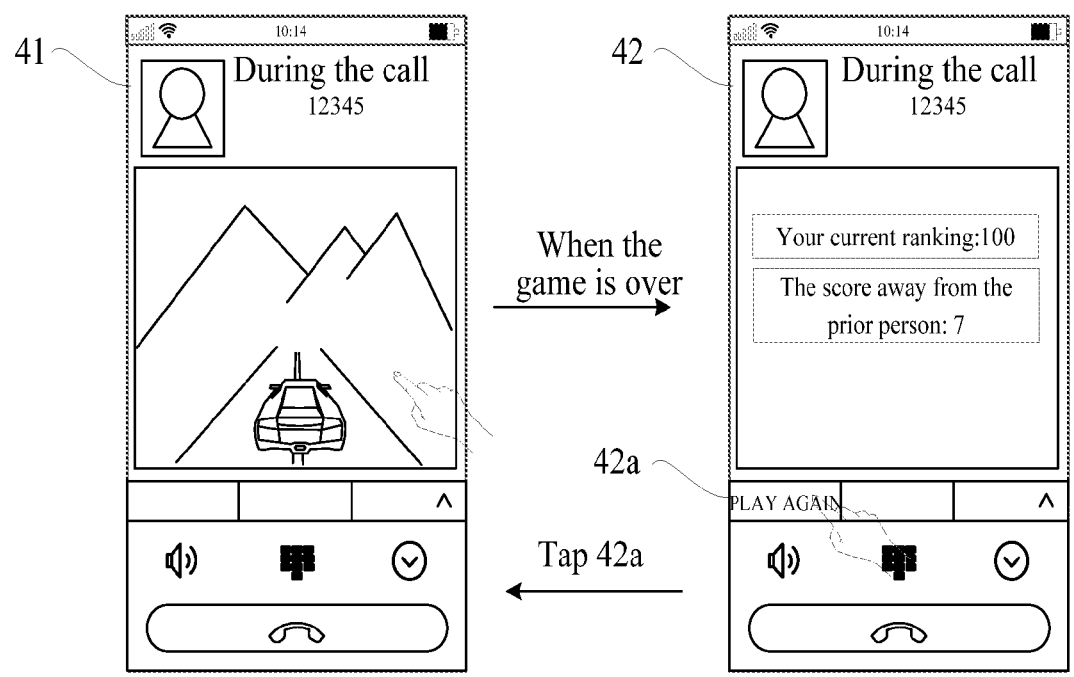
FIG. 4B is a block diagram of a telephone interaction page according to the embodiment shown in FIG. 4A.

At 408, the user terminal provides the entertainment service to the user in the call interface based on the entertainment interaction information. In some embodiments, the user terminal runs and displays the entertainment interaction information in the call interface. Thereafter, the user and/or the telephone agent system may control the entertainment interaction information. For example, as shown in FIG. 4B, the user may play a racing game on a page 41. The user may tap corresponding positions to play the game. When the entertainment is over, the telephone agent system may control the user terminal to switch to a page 42 to display the ranking of the user among all users. The user may also tap a "PLAY AGAIN" button 42a on the page 42 to switch back to the page 41 to restart the game.

In some embodiments, when the entertainment interaction information is running, the background music may be played via the voice channel. This not only saves the communication resources of the data channel, but also utilizes the idle voice channel.

Figure 5A:
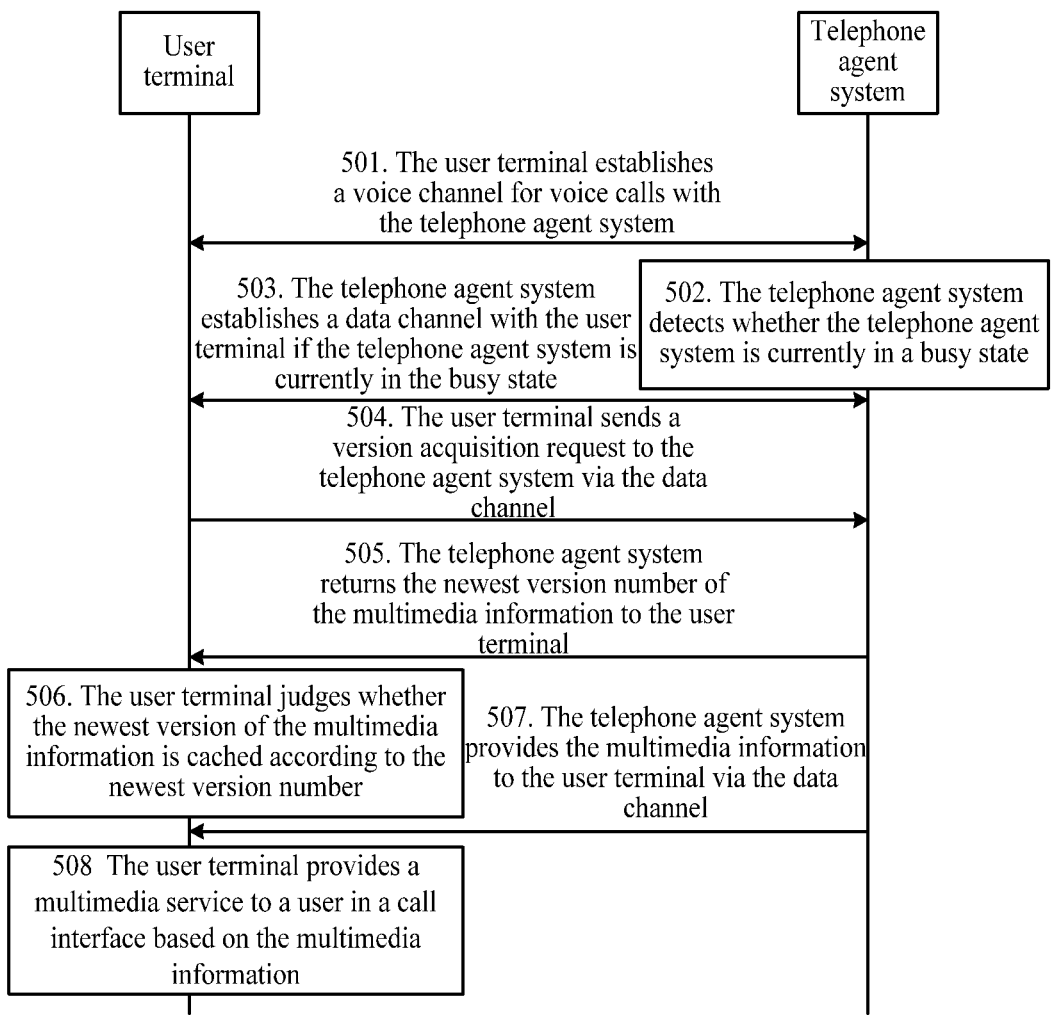
FIG. 5A is a flow chart of a method for telephone interaction according to another exemplary embodiment.

FIG. 5A shows a flow chart of another exemplary method for telephone interaction consistent with embodiments of the present disclosure. The method shown in FIG. 5A can be implemented in, for example, the implementation environment shown in FIG. 1A or 1B. According to this method, the telephone agent system provides a multimedia service for the user terminal.

As shown in FIG. 5A, at 501, the user terminal establishes a voice channel for voice calls with the telephone agent system. That is, when a user needs a human voice service from the telephone agent system, the user dials the number of the telephone agent system using the user terminal to establish the voice channel for voice calls with the telephone agent system.

At 502, the telephone agent system detects whether the telephone agent system is currently in a busy state. That is, the telephone agent system detects whether it is currently in a busy state after the voice channel with the user terminal is established. In some embodiments, the telephone agent system detects whether it is in the busy state after every predetermined time period, so that it can provide the human voice service to the user terminal in time.

At 503, the telephone agent system establishes a data channel with the user terminal if the telephone agent system is currently in the busy state. That is, when the telephone agent system is in the busy state, the telephone agent system establishes a data channel with the user terminal for providing a multimedia service to the user terminal. The multimedia service may include services such as video play, online news browsing, and play of specific songs, etc.

The data channel may be established by various approaches. For example, the user terminal may directly establish the data channel with the telephone agent system. Alternatively, the user terminal may establish the data channel with the telephone agent system via a third-party service platform. The third-party service platform may be configured to record various data generated when each user terminal performs the method for telephone interaction consistent with embodiments of the present disclosure.

In some embodiments, to directly establish the data channel, the telephone agent system sends a data channel establishment request to the user terminal. That is, when the telephone agent system is in the busy state, the telephone agent system may send a data channel establishment request to the user terminal if it needs to provide a multimedia service to the user terminal. When the user terminal receives the data channel establishment request, the user terminal establishes the data channel with the telephone agent system according to the circumstances. Whether the user terminal establishes the data channel with the telephone agent system may be decided by the user. That is, the user may decide whether to accept the multimedia service provided by the telephone agent system.

In some embodiments, to establish the data channel via the third-party service platform, the telephone agent system sends a data channel establishment request to the third-party service platform requesting to establish the data channel with the user terminal. The third-party server sends the data channel establishment request to the corresponding user terminal. When the user terminal receives the data channel establishment request, the user terminal establishes the data channel with the telephone agent system via the third-party service platform according to the circumstances. That is, the telephone agent system establishes a data channel with the third-party service platform, and the user terminal establishes a data channel with the third-party service platform. After these data channels are successfully established, all the data transmitted between the user terminal and the telephone agent system are forwarded by the third-party service platform.

In some embodiments, the user terminal or the telephone agent system chooses how to establish the data channel between the user terminal and the telephone agent system according to circumstances.

After establishing the data channel with the telephone agent system, the user terminal checks whether it has cached the multimedia information of any version. If so, the process proceeds to 504. If not, the user terminal sends to the telephone agent system an instruction of waiting to receive the multimedia information, and the process proceeds to 507.

At 504, the user terminal sends a version acquisition request to the telephone agent system via the data channel. That is, if the user terminal has cached the multimedia information of any version, the user terminal may send a version acquisition request to the telephone agent system via the data channel.

At 505, the telephone agent system returns the newest version number of the multimedia information to the user terminal. When receiving the version acquisition request sent by the user terminal, the telephone agent system may return the newest version number of the multimedia information to the user terminal via the data channel.

At 506, the user terminal judges whether it has cached the newest version of the multimedia information according to the newest version number. That is, the user terminal receives the newest version number of the multimedia information returned by the telephone agent system via the data channel and judges whether the newest version of the multimedia information is cached locally according to the newest version number.

If the user terminal does not cache the newest version of the multimedia information, the user terminal acquires the multimedia information provided by the telephone agent system via the data channel. For example, if the multimedia information cached in the user terminal is old multimedia play information, then the user terminal sends to the telephone agent system an instruction of waiting for receiving the multimedia information, and the process proceeds to 507.

On the other hand, if the user terminal has cached the newest version of the multimedia information, then the user terminal provides the multimedia service to the user in the call interface based on the multimedia information (508 in FIG. 5A).

At 507, the telephone agent system provides the multimedia information for the user terminal via the data channel. More particularly, after receiving the instruction of waiting for receiving the multimedia information sent by the user terminal, the telephone agent system provides the multimedia information to the user terminal. In some embodiments, the multimedia information may be in a webpage form. The user terminal acquires the multimedia information in the webpage form provided by the telephone agent system via the data channel. The webpage form may comply with the HTML5 (Hyper Text Markup Language 5) standard.

According to the present disclosure, the page of the multimedia information can be provided to the user terminal by different approaches, such as Approaches I-III described below.

According to Approach I, the user terminal sends the acquisition request for multimedia information to the telephone agent system via the data channel. This request may be sent by the user terminal automatically, or may be sent by the user terminal under the operation of the user. After receiving the acquisition request, the telephone agent system provides the multimedia information in the webpage form to the user terminal based on the acquisition request.

Because the multimedia information in the webpage form may include one or more pages, the acquisition request for multimedia information may be a request for acquiring all pages of the multimedia information or a request for acquiring one page of the multimedia information. For example, for multimedia information for on-line news browsing, the user terminal may first acquire the main page of the multimedia information, which may contain only news headlines. When the user clicks on one of the headlines, the user terminal sends to the telephone agent system an acquisition request for acquiring a content page corresponding to that headline. After receiving this request, the telephone agent system sends to the user terminal the content page in the multimedia information that corresponds to that headline.

According to Approach II, the telephone agent system pushes the multimedia information in the webpage form to the user terminal via the data channel. That is, the telephone agent system directly sends the multimedia information in the webpage form to the user terminal, and the user terminal receives the multimedia information in the webpage form. The pushing process may be controlled by a customer service representative of the telephone agent system.

Similarly, because the multimedia information may include one or more pages, the telephone agent system may push all pages of the multimedia information in a single push process or may push one page of the multimedia information in a single push process according to the control of the customer service representative.

Approach III is a combination of Approaches I and II. That is, the user terminal may passively receive the multimedia information pushed by the telephone agent system, or actively send the acquisition request for multimedia information to acquire the multimedia information from the telephone agent system. For example, the telephone agent system pushes to the user terminal the main page of multimedia information for on-line news browsing, which only contains news headlines. When the user clicks on one of the news headline, the user terminal sends an acquisition request for the content page to the telephone agent system. After receiving this request, the telephone agent system sends to the user terminal the content page in the multimedia information that corresponds to that news headline.

In some embodiments, if the user terminal caches the old multimedia information, then when receiving the newest version of the multimedia information, the user terminal does not receive the part in the newest version of the multimedia information that is the same as that in the old multimedia information, such as, for example, the same picture files and/or audio files. Judgment information regarding the same part may be contained in the newest version number of the multimedia information acquired by the user terminal. Alternatively, the telephone agent system can acquire the version number of the old multimedia information cached in the user terminal, and then send the part in the newest version of the multimedia information that is different from that in the old multimedia information according to the version number. This reduces waste of communication resources and improves efficiency in information acquisition.

Figure 5B:
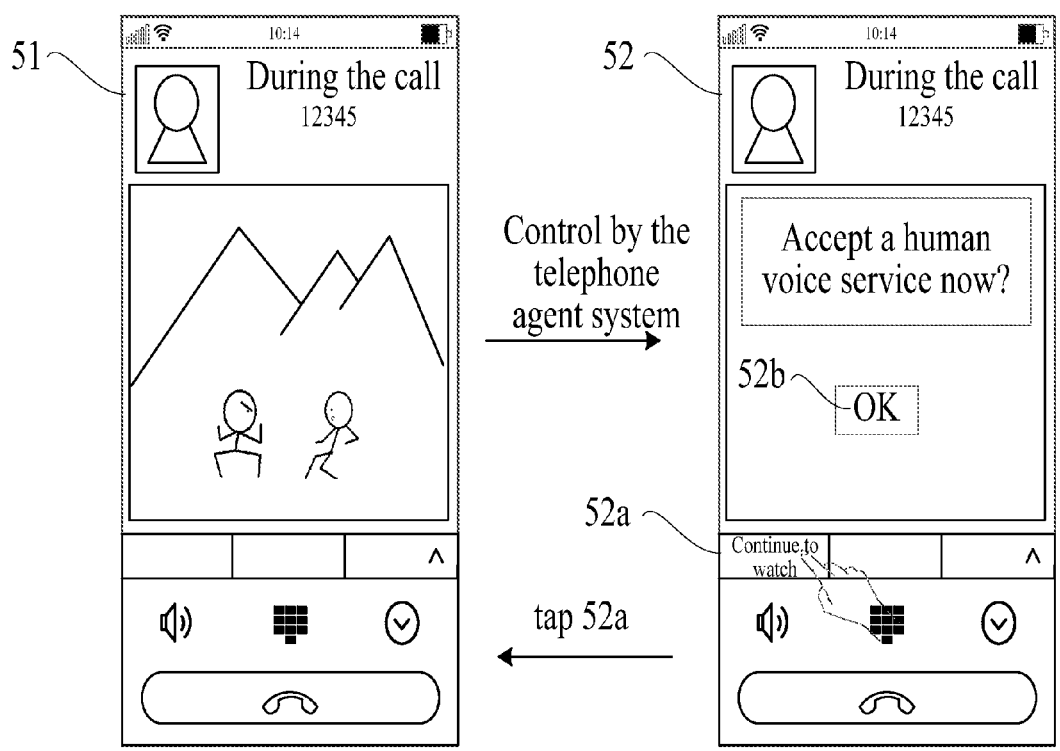
FIG. 5B is a block diagram of a telephone interaction page according to the embodiment shown in FIG. 5A.

At 508, the user terminal provides the multimedia service to the user in the call interface based on the multimedia information. In some embodiments, the user terminal runs and displays the multimedia information in the call interface. Thereafter, the user and/or the telephone agent system may control the multimedia information. For example, as shown in FIG. 5B, the user terminal is playing a piece of video on a page 51, and the telephone agent system may control the user terminal to pause playing and switch to a page 52 to remind the user when the telephone agent system detects that it is no longer in the busy state. The user may switch back to the page 51 to continue playing of the video by tapping a button 52a, or may accept the human voice service by tapping a button 52b.

Figure 6A:
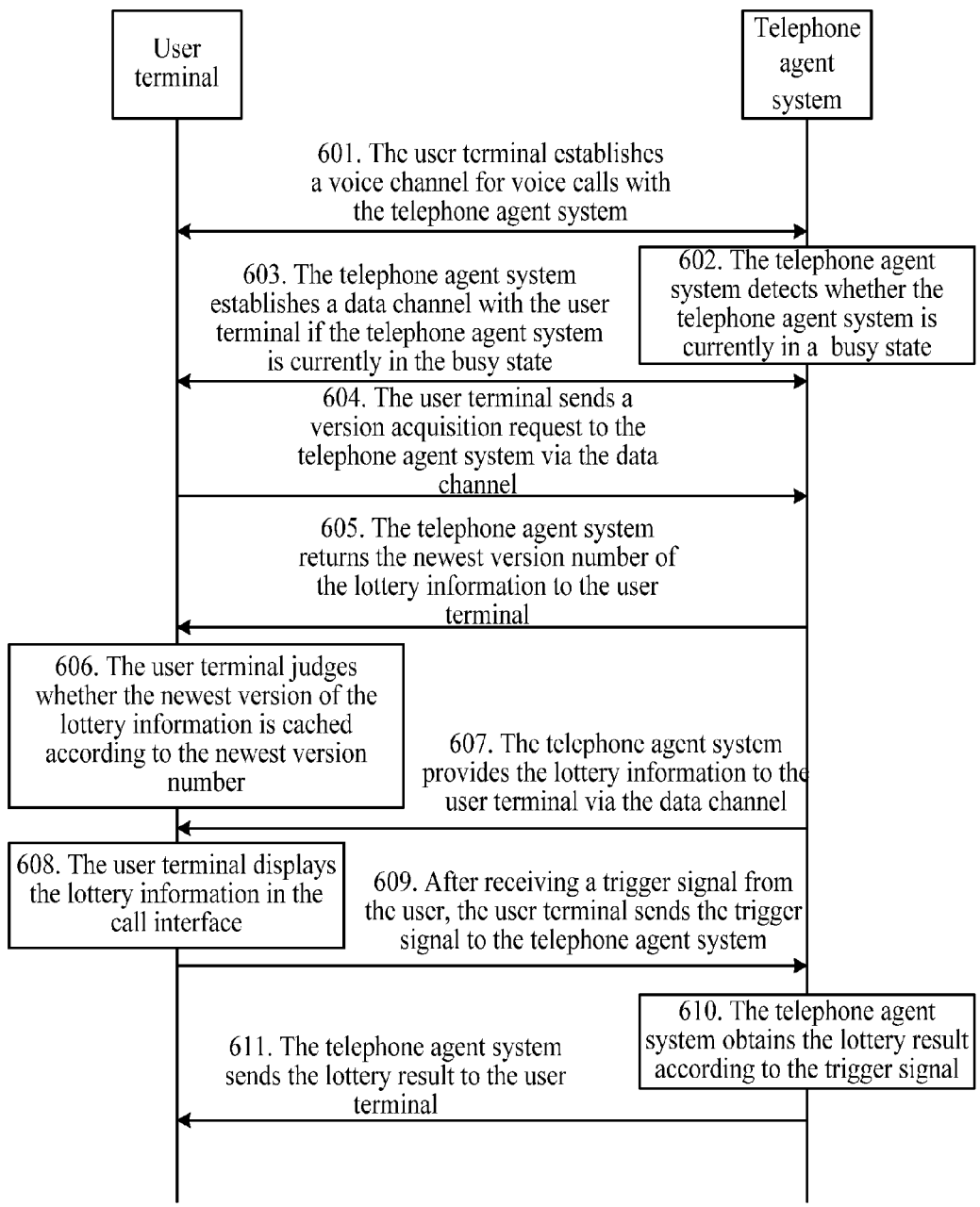
FIG. 6A is a flow chart of a method for telephone interaction according to another exemplary embodiment.

FIG. 6A shows a flow chart of another exemplary method for telephone interaction consistent with embodiments of the present disclosure. The method shown in FIG. 6A can be implemented in, for example, the implementation environment shown in FIG. 1A or 1B. According to this method, a telephone agent system provides a lottery service to a user terminal.

As shown in FIG. 6A, at 601, the user terminal establishes a voice channel for voice calls with the telephone agent system. When a user needs a human voice service from the telephone agent system, the user dials the number of the telephone agent system using the user terminal to establish the voice channel for voice calls with the telephone agent system.

At 602, the telephone agent system detects whether the telephone agent system is currently in a busy state after the voice channel with the user terminal is established.

At 603, the telephone agent system establishes a data channel with the user terminal if the telephone agent system is currently in the busy state. When the telephone agent system is in the busy state, the telephone agent system establishes a data channel with the user terminal for providing a lottery service to the user terminal.

The data channel may be established by various approaches. For example, the user terminal may directly establish the data channel with the telephone agent system. Alternatively, the user terminal may establish the data channel with the telephone agent system via a third-party service platform. The third-party service platform may be configured to record various data generated when each user terminal performs the method for telephone interaction consistent with embodiments of the present disclosure.

In some embodiments, to directly establish the data channel, the telephone agent system sends a data channel establishment request to the user terminal if it needs to provide a lottery service to the user terminal. When the user terminal receives the data channel establishment request, the user terminal establishes the data channel with the telephone agent system according to the circumstances. Whether the user terminal establishes the data channel with the telephone agent system may be decided by the user. That is, the user may decide whether to accept the lottery service provided by the telephone agent system.

In some embodiments, to establish the data channel via the third-party service platform, the telephone agent system sends a data channel establishment request to the third-party service platform requesting to establish the data channel with the user terminal. The third-party server sends the data channel establishment request to the corresponding user terminal. When the user terminal receives the data channel establishment request, the user terminal establishes the data channel with the telephone agent system via the third-party service platform according to the circumstances. That is, the telephone agent system establishes a data channel with the third-party service platform, and the user terminal establishes a data channel with the third-party service platform. After these data channels are successfully established, all the data transmitted between the user terminal and the telephone agent system are forwarded by the third-party service platform.

In some embodiments, the user terminal or the telephone agent system chooses how to establish the data channel between the user terminal and the telephone agent system according to the circumstances.

After establishing the data channel with the telephone agent system, the user terminal checks whether it has cached the lottery information of any version. If so, the process proceeds to 604. If not, the user terminal sends to the telephone agent system an instruction of waiting to receive the lottery information, and the process proceeds to 607.

At 604, the user terminal sends a version acquisition request to the telephone agent system via the data channel. If the user terminal has cached the lottery information of any version, the user terminal sends a version acquisition request to the telephone agent system via the data channel.

At 605, when receiving the version acquisition request sent by the user terminal, the telephone agent system returns the newest version number of the lottery information to the user terminal via the data channel.

At 606, the user terminal receives the newest version number of the lottery information returned by the telephone agent system via the data channel and judges whether the newest version of the lottery information is cached locally according to the newest version number.

If the user terminal does not cache the newest version of the lottery information, the user terminal acquires the lottery information provided by the telephone agent system via the data channel. That is, if the lottery information cached in the user terminal is old lottery information, then the user terminal sends to the telephone agent system an instruction of waiting for receiving the lottery information, and the process proceeds to 607.

On the other hand, if the user terminal has cached the newest version of the lottery information, the user terminal provides the lottery service to the user in the call interface based on the lottery information (608 in FIG. 6A).

At 607, after receiving the instruction of waiting for receiving the lottery information sent by the user terminal, the telephone agent system provides the lottery information to the user terminal so that the telephone agent system can provide the lottery service to the user terminal via the data channel. In some embodiments, the lottery information may be in a webpage form. The user terminal acquires the lottery information in the webpage form provided by the telephone agent system via the data channel. The webpage form may comply with the HTML5 (Hyper Text Markup Language 5) standard.

According to the present disclosure, the page of the lottery information can be provided to the user terminal by different approaches, such as Approaches I-III described below.

According to Approach I, the user terminal sends the acquisition request for lottery information to the telephone agent system via the data channel. This request may be sent by the user terminal automatically, or may be sent by the user terminal under the operation of the user. After receiving the acquisition request, the telephone agent system provides the lottery information in the webpage form to the user terminal based on the acquisition request.

Because the lottery information in the webpage form may include one or more pages, the acquisition request for lottery information may be a request for acquiring all pages of the lottery information or a request for acquiring one page of the lottery information. For example, the user terminal may first acquire the main page of the lottery information. When the user clicks on a draw lottery button to participate in the lottery, the user terminal sends an acquisition request for acquiring a lottery result page to the telephone agent system. The telephone agent system sends the lottery result page to the user terminal after receiving the request.

According to Approach II, the telephone agent system pushes the lottery information in the webpage form to the user terminal via the data channel, and the user terminal receives the lottery information in the webpage form. The pushing process may be controlled by a customer service representative of the telephone agent system.

Similarly, because the lottery information may include one or more pages, the telephone agent system may push all pages of the lottery information in a single push process or may push one page of the lottery information in a single push process according to the control of the customer service representative.

Approach III is a combination of Approaches I and II. That is, the user terminal may passively receive the lottery information pushed by the telephone agent system, or actively send the acquisition request for lottery information to acquire the lottery information from the telephone agent system. For example, the telephone agent system pushes the main page of the lottery information to the user terminal. After the user clicks the draw lottery button, the user terminal may send an acquisition request for lottery information to the telephone agent system. After receiving this request, the telephone agent system sends the lottery result page to the user terminal.

In some embodiments, if the user terminal caches the old lottery information, then when receiving the newest version of the lottery information, the user terminal does not receive the part in the newest version of the lottery information that is the same as that in the old lottery information, such as, for example, the same picture files and/or audio files. Judgment information regarding the same part may be contained in the newest version number of the lottery information acquired by the user terminal. Alternatively, the telephone agent system can acquire the version number of the old lottery information cached in the user terminal, and then send the part in the newest version of the lottery information that is different from that in the old lottery information according to the version number. This reduces waste of communication resources and improves efficiency in information acquisition.

At 608, after acquiring the lottery information, the user terminal displays the lottery information in the call interface.

At 609, the user terminal receives a trigger signal from the user and sends the trigger signal to the telephone agent system. That is, after the user terminal displays the lottery information in the call interface, the user may send a trigger signal in the call interface to draw lottery. The user terminal sends the trigger signal to the telephone agent system.

At 610, after receiving the trigger signal, the telephone agent system obtains a lottery result according to the trigger signal.

At 611, the telephone agent system sends the lottery result to the user terminal.

After the telephone agent system sends the lottery result to the user terminal, the user terminal may switch to a reminding page to inform the user of the lottery result.

In some embodiments, when the telephone agent system provides the lottery service to the user terminal, both the telephone agent system and the user terminal may control display contents of the display interface.

Figure 6B:
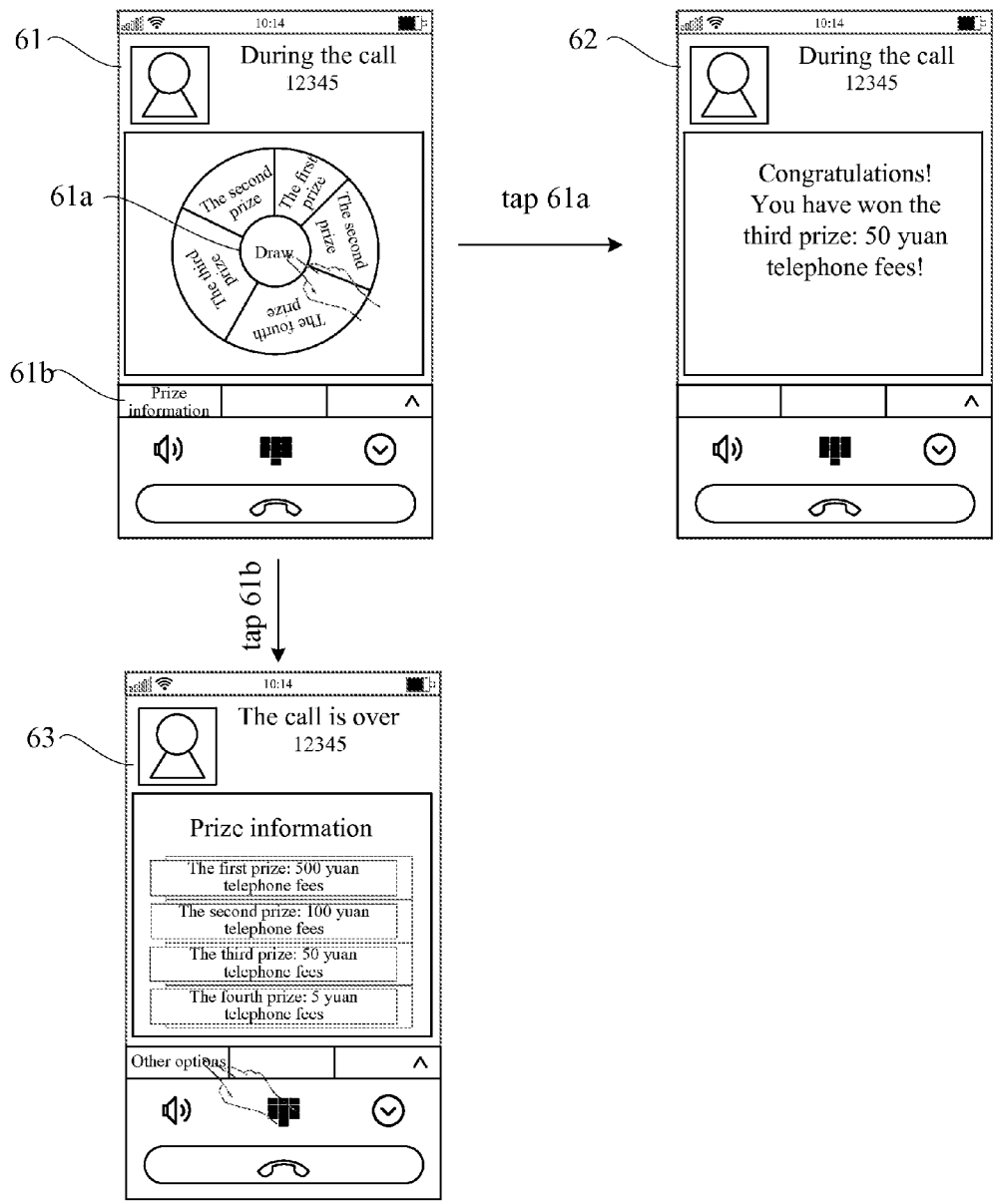
FIG. 6B is a block diagram of a telephone interaction page according to the embodiment shown in FIG. 6A.

For example, as shown in FIG. 6B, after the user taps a "DRAW" button 61a on a page 61, the user terminal sends the trigger signal to the telephone agent system. After receiving the lottery result sent by the telephone agent system, the user terminal switches to a result page 62 to display the lottery result. In addition, the user may tap a "Prize information" button 61b on the page 61, in response to which the user terminal switches to a prize information page 63.

According to the present disclosure, the telephone agent system can provide various entertainment services to the user terminal, such as those described above. The telephone agent system can provide one or more of these services to the user terminal. The number and type of services can be determined by the user terminal or the telephone agent service.

Figure 7:
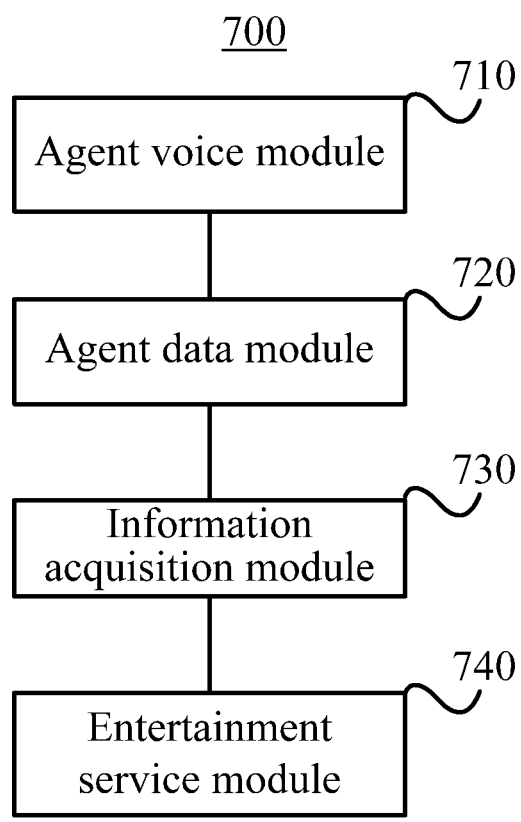
FIG. 7 is a block diagram of a device for telephone interaction according to an exemplary embodiment.

FIG. 7 shows a block diagram of an exemplary device 700 for telephone interaction consistent with embodiments of the present disclosure. The device 700 may be implemented by software, hardware, or a combination thereof to form a part or whole of, for example, the user terminal 110 shown in FIG. 1A. As shown in FIG. 7, the device 700 includes an agent voice module 710, an agent data module 720, an information acquisition module 730, and an entertainment service module 740.

The agent voice module 710 is configured to establish a voice channel for voice calls with a telephone agent system. The agent data module 720 is configured to establish a data channel with the telephone agent system when the telephone agent system is in a busy state. The information acquisition module 730 is configured to acquire entertainment interaction information provided by the telephone agent system via the data channel. The entertainment service module 740 is configured to provide an entertainment service to a user in a call interface based on the entertainment interaction information.

Figure 8:
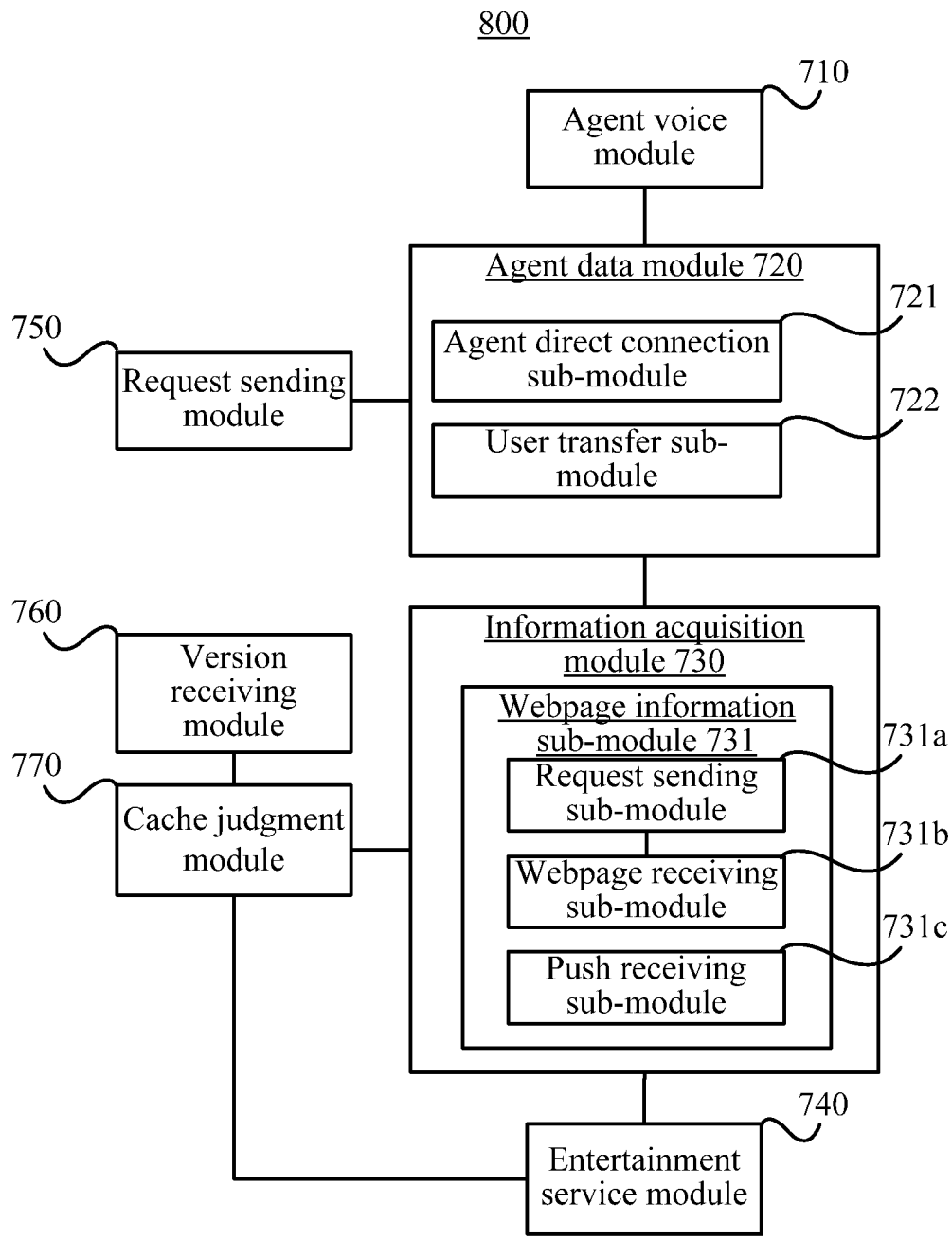
FIG. 8 is a block diagram of a device for telephone interaction according to another exemplary embodiment.

FIG. 8 shows a block diagram of another exemplary device 800 for telephone interaction consistent with embodiments of the present disclosure. The device 800 may be implemented by software, hardware, or a combination thereof to form a part or whole of, for example, the user terminal 110 shown in FIG. 1B. As shown in FIG. 8, the device 800 includes the agent voice module 710, the agent data module 720, the information acquisition module 730, and the entertainment service module 740.

In some embodiments, as shown in FIG. 8, the information acquisition module 730 includes a webpage information sub-module 731 configured to acquire the entertainment interaction information in a webpage form provided by the telephone agent system via the data channel.

In some embodiments, as shown in FIG. 8, the webpage information sub-module 731 includes a request sending sub-module 731a and a webpage receiving sub-module 731b. The webpage information sub-module 731 may further include a push receiving sub-module 731c. The request sending sub-module 731a is configured to send an information acquisition request to the telephone agent system via the data channel. The webpage receiving sub-module 731b is configured to receive the entertainment interaction information in the webpage form returned by the telephone agent system based on the information acquisition request. The push receiving sub-module 731c is configured to receive the entertainment interaction information in the webpage form pushed by the telephone agent system via the data channel.

In some embodiments, the entertainment interaction information includes, for example, multimedia information and/or game information.

In some embodiments, as shown in FIG. 8, the agent data module 720 includes an agent direct connection sub-module 721 configured to directly establish the data channel with the telephone agent system and a user transfer sub-module 722 configured to establish the data channel with the telephone agent system via a third-party service platform.

In some embodiments, as shown in FIG. 8, the device 800 further includes a request sending module 750, a version receiving module 760, and a cache judgment module 770. The request sending module 750 is configured to send a version acquisition request to the telephone agent system via the data channel. The version receiving module 760 is configured to receive the newest version number of the entertainment interaction information returned by the telephone agent system via the data channel. The cache judgment module 770 is configured to judge whether the newest version of the entertainment interaction information is cached according to the newest version number.

In some embodiments, the information acquisition module 730 is further configured to acquire the entertainment interaction information provided by the telephone agent system via the data channel when the entertainment interaction information is not cached. The entertainment service module 740 is further configured to provide the entertainment service to the user in the call interface based on the interaction information when the entertainment interaction information is cached.

Figure 9:
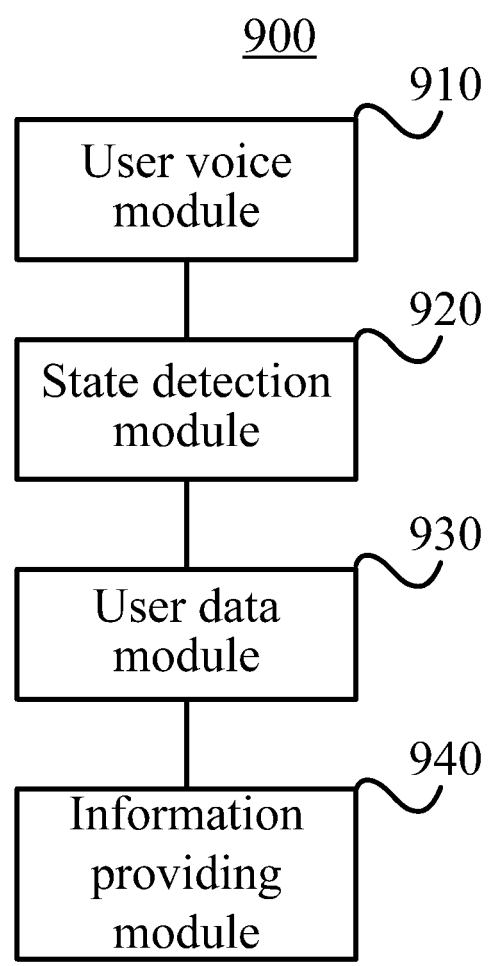
FIG. 9 is a block diagram of a device for telephone interaction according to another exemplary embodiment.

FIG. 9 shows a block diagram of another exemplary device 900 for telephone interaction consistent with embodiments of the present disclosure. The device 900 may be implemented by software, hardware, or a combination thereof to form a part or whole of, for example, the telephone agent system 120 shown in FIG. 1A. The device 900 includes a user voice module 910, a state detection module 920, a user data module 930, and an information providing module 940.

The user voice module 910 is configured to establish a voice channel for voice calls with a user terminal. The state detection module 920 is configured to detect whether the telephone agent system is currently in a busy state. The user data module 930 is configured to establish a data channel with the user terminal if the telephone agent system is currently in the busy state. The information providing module 940 is configured to provide the entertainment interaction information to the user terminal via the data channel, for the user terminal to provide an entertainment service to a user in a call interface based on the entertainment interaction information.

Figure 10:
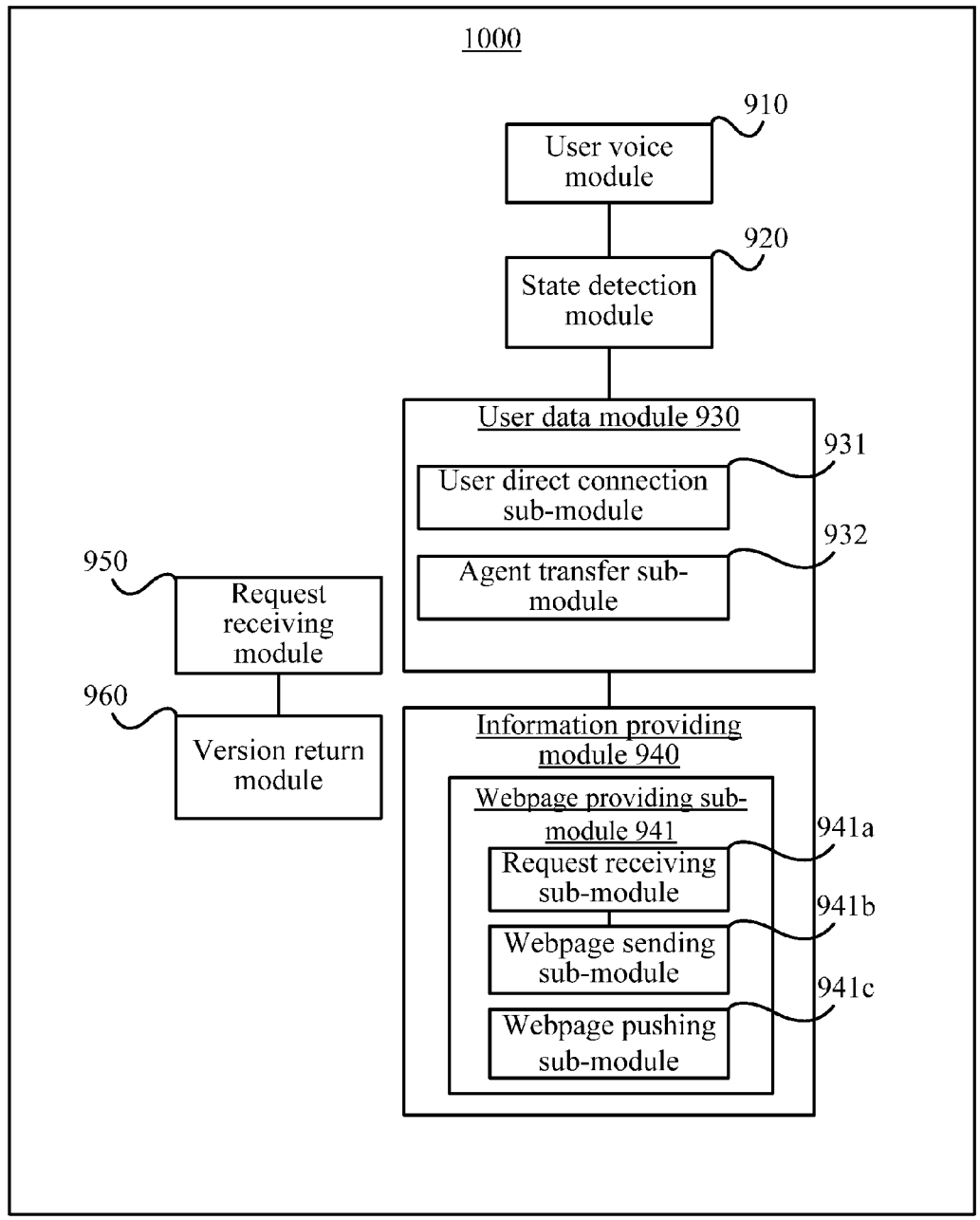
FIG. 10 is a block diagram of a device for telephone interaction according to another exemplary embodiment.

FIG. 10 shows a block diagram of another exemplary device 1000 for telephone interaction consistent with embodiments of the present disclosure. The device 1000 may be implemented by software, hardware, or a combination thereof to form a part or whole of, for example, the telephone agent system 120 shown in FIG. 1B. The device 1000 includes the user voice module 910, the state detection module 920, the user data module 930, and the information providing module 940.

In some embodiments, as shown in FIG. 10, the information providing module 940 includes a webpage providing sub-module 941 configured to provide the entertainment interaction information in a webpage form to the user terminal via the data channel.

In some embodiments, as shown in FIG. 10, the webpage providing sub-module 941 includes a request receiving sub-module 941*a* and a webpage sending sub-module 941*b*. The webpage providing sub-module 941 may further include a webpage pushing sub-module 941*c*. The request receiving sub-module 941*a* is configured to receive an information acquisition request sent by the user terminal via the data channel. The webpage sending sub-module 941*b* is configured to provide the entertainment interaction information in the webpage form to the user terminal based on the information acquisition request. The webpage pushing sub-module 941*c* is configured to push the entertainment interaction information in the webpage form to the user terminal via the data channel.

In some embodiments, as shown in FIG. 10, the user data module 930 includes a user direct connection sub-module 931 configured to directly establish the data channel with the user terminal and an agent transfer sub-module 932 configured to establish the data channel with the user terminal via a third-party service platform.

In some embodiments, as shown in FIG. 10, the device 1000 further includes a request receiving module 950 configured to receive a version acquisition request sent by the user terminal via the data channel and a version return module 960 configured to return the newest version number of the entertainment interaction information to the user terminal. The user terminal then directly provides an entertainment service to a user in a call interface based on the entertainment interaction information when detecting, according to the newest version number, that the newest version of the entertainment interaction information is cached.

Figure 11:
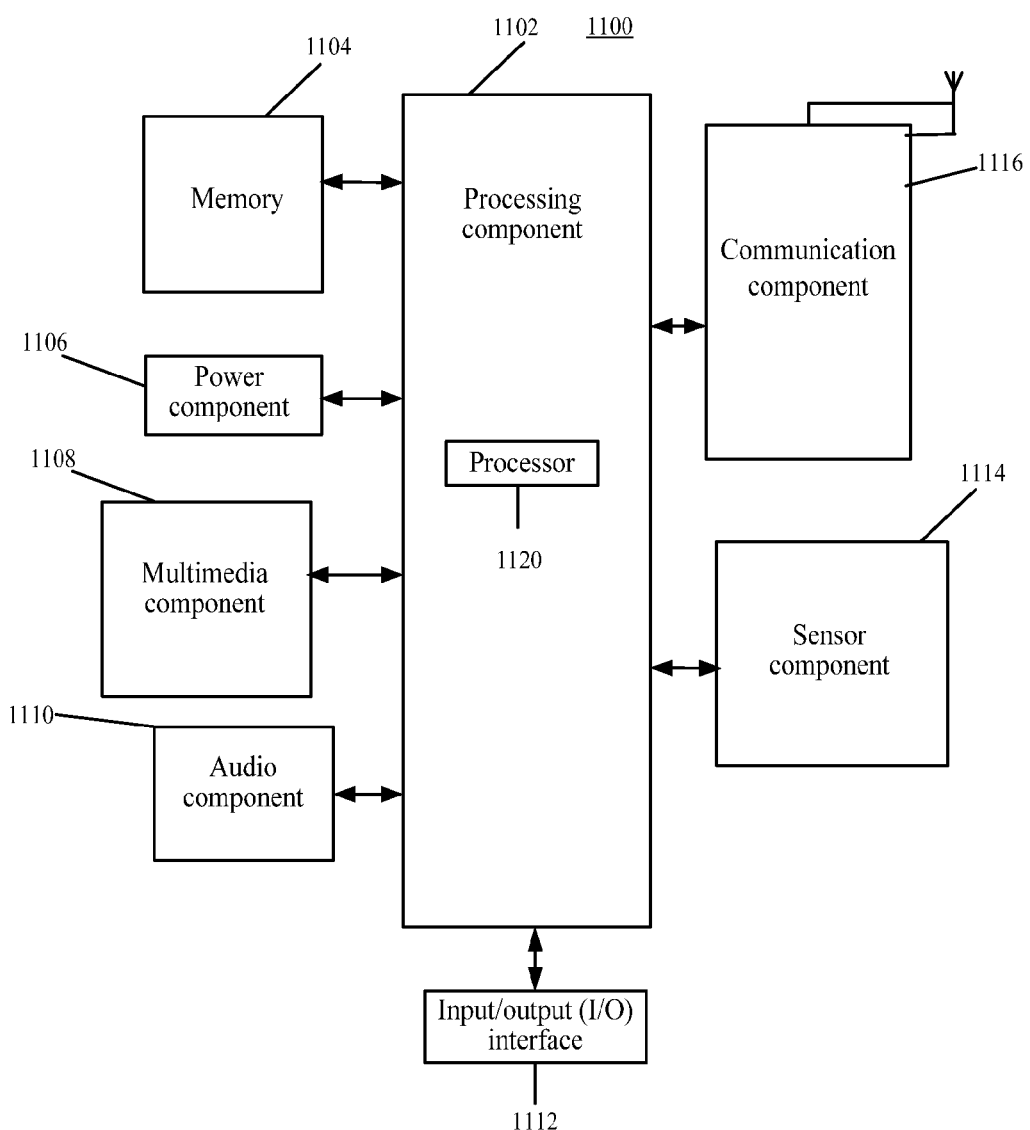
FIG. 11 is a block diagram of a device for telephone interaction according to an exemplary embodiment.

FIG. 11 is a block diagram of an exemplary device 1100 as a user terminal consistent with embodiments of the present disclosure. For example, the device 1100 may be a mobile phone, a computer, a digital broadcast terminal, a messaging device, a gaming console, a tablet, a medical device, exercise equipment, a personal digital assistant, or the like.

As shown in FIG. 11, the device 1100 includes one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium, such as included in the memory 1104, storing instructions that, when executed by the processor 1120 in the device 1100, cause the device 1100 to perform methods consistent with embodiments of the present disclosure. For example, the non-transitory computer-readable storage medium may be a ROM, a RAM, a CD-ROM, a magnetic tape, a floppy disc, an optical data storage device, or the like.

Figure 12:
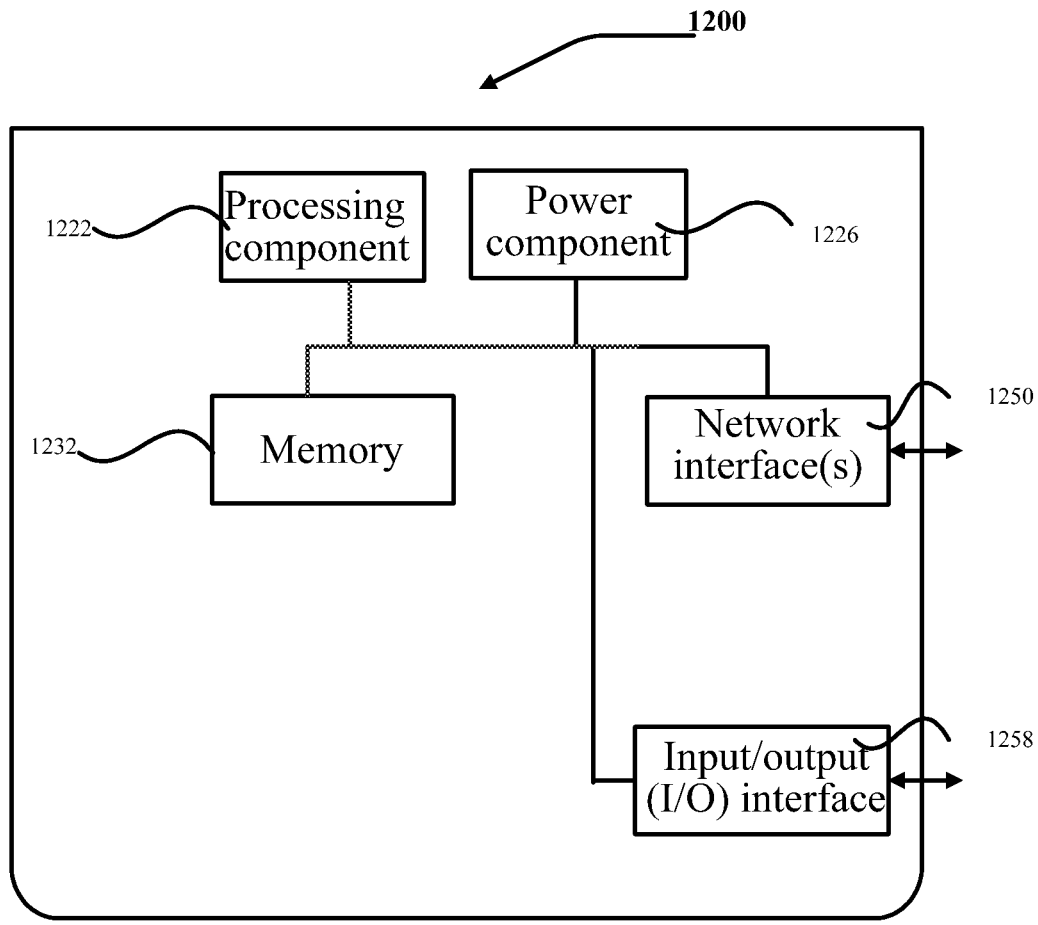
FIG. 12 is a block diagram of a device for telephone interaction according to an exemplary embodiment.

FIG. 12 is a block diagram of another exemplary device 1200 for telephone interaction consistent with embodiments of the present disclosure. For example, the device 1200 may be provided as a telephone agent system or a third-party service platform. Referring to FIG. 12, the device 1200 includes a processing component 1222 that further includes one or more processors, and memory resources represented by a memory 1232 for storing instructions executable by the processing component 1222, such as application programs. The application programs stored in the memory 1232 may include one or more modules each corresponding to a set of instructions. Further, the processing component 1222 is configured to execute the instructions to perform a method consistent with embodiments of the present disclosure.

The device 1200 also includes a power component 1226 configured to perform power management of the device 1200, a wired or wireless network interface 1250 configured to connect the device 1200 to a network, and an input/output (I/O) interface 1258. The device 1200 may operate based on an operating system stored in the memory 1232, such as Windows Server™, Mac OS X™, Unix™, Linux™, FreeBSD™, or the like.

Figure 13:
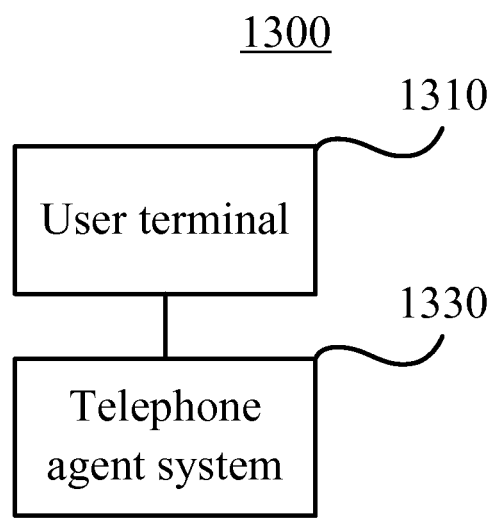
FIG. 13 is a block diagram of a system for telephone interaction according to an exemplary embodiment.

FIG. 13 shows a block diagram of an exemplary system 1300 for telephone interaction consistent with embodiments of the present disclosure. The system 1300 includes a user terminal 1310 and a telephone agent system 1330. The user terminal 1310 includes, for example, any one of the devices shown in FIGS. 7, 8, and 11. The telephone agent system 1330 includes, for example, any one of the devices shown in FIGS. 9, 10, and 12.

Operations of devices consistent with embodiments of the present disclosure are similar to the methods described above, and thus the detailed descriptions thereof are omitted here.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for telephone interaction, comprising:
   establishing a voice channel for voice calls completely in a circuit switched domain with a telephone agent system;
   establishing, via a third-party service platform, a data channel completely in a packet switched domain with the telephone agent system if the telephone agent system is detected to be in a busy state after the voice channel is established;
   acquiring information provided by the telephone agent system via the data channel, the information being associated with an entertainment service; and
   providing the entertainment service to a user based on the information,
   wherein acquiring the information and providing the entertainment service include:
     sending a version acquisition request to the telephone agent system via the data channel;
     receiving a newest version number of entertainment interaction information returned by the telephone agent system via the data channel in response to the version acquisition request;

judging, according to the newest version number, whether a newest version of the entertainment interaction information is cached;

if the newest version of the entertainment interaction information is not cached, acquiring the entertainment interaction information provided by the telephone agent system via the data channel; and if the newest version of the entertainment interaction information is cached, providing the entertainment service based on the cached newest version of the entertainment interaction information.

2. The method according to claim 1, wherein acquiring the information further includes:

acquiring entertainment interaction information in a webpage form provided by the telephone agent system via the data channel.

3. The method according to claim 1, wherein acquiring the information further includes:

sending an information acquisition request to the telephone agent system via the data channel and receiving entertainment interaction information returned by the telephone agent system in response to the information acquisition request; or receiving the entertainment interaction information pushed by the telephone agent system via the data channel.

4. A method for a telephone agent system to perform a telephone interaction with a user terminal, comprising:

establishing a voice channel for voice calls completely in a circuit switched domain with the user terminal;

detecting, after the voice channel is established, whether the telephone agent system is in a busy state;

establishing, via a third-party service platform, a data channel completely in a packet switched domain with the user terminal if it is detected that the telephone agent system is in the busy state; and providing information to the user terminal via the data channel, the information being associated with an entertainment service to be provided by the user terminal to a user, wherein providing the information includes:

receiving a version acquisition request from the user terminal via the data channel; and returning a newest version number of entertainment interaction information to the user terminal via the data channel in response to the version acquisition request.

5. The method according to claim 4, wherein providing the information further includes:

providing entertainment interaction information in a webpage form to the user terminal via the data channel.

6. The method according to claim 4, wherein providing the information further includes:

receiving an information acquisition request sent by the user terminal via the data channel and providing entertainment interaction information to the user terminal based on the information acquisition request; or pushing the entertainment interaction information to the user terminal via the data channel.

7. A device for telephone interaction, comprising:

a processor; and a non-transitory computer-readable storage medium storing instructions that, when executed by the processor, cause the processor to:

establish a voice channel for voice calls completely in a circuit switched domain with a telephone agent system;

establish, via a third-party service platform, a data channel completely in a packet switched domain with the telephone agent system if the telephone agent system is detected to be in a busy state after the voice channel is established;

acquire information provided by the telephone agent system via the data channel, the information being associated with an entertainment service; and provide the entertainment service to a user based on the information, wherein, in acquiring the information and providing the entertainment service, the instructions further cause the processor to:

send a version acquisition request to the telephone agent system via the data channel;

receive a newest version number of entertainment interaction information returned by the telephone agent system via the data channel in response to the version acquisition request;

judge, according to the newest version number, whether a newest version of the entertainment interaction information is cached;

if the newest version of the entertainment interaction information is not cached, acquire the entertainment interaction information provided by the telephone agent system via the data channel; and if the newest version of the entertainment interaction information is cached, provide the entertainment service based on the cached newest version of the entertainment interaction information.

8. The device according to claim 7, wherein the instructions further cause the processor to:

acquire entertainment interaction information in a webpage form provided by the telephone agent system via the data channel.

9. The device according to claim 7, wherein the instructions further cause the processor to:

send an information acquisition request to the telephone agent system via the data channel and receive entertainment interaction information returned by the telephone agent system in response to the information acquisition request; or receive the entertainment interaction information pushed by the telephone agent system via the data channel.

10. A device for telephone interaction, comprising:

a processor; and a non-transitory computer-readable storage medium storing instructions that, when executed by the processor, cause the processor to:

establish a voice channel for voice calls completely in a circuit switched domain with the user terminal;

detect, after the voice channel is established, whether the telephone agent system is in a busy state;

establish, via a third-party service platform, a data channel completely in a packet switched domain with the user terminal if it is detected that the telephone agent system is in the busy state; and provide information to the user terminal via the data channel, the information being associated with an entertainment service to be provided by the user terminal to a user, wherein in providing the information, the instructions further cause the processor to:

receive a version acquisition request from the user terminal via the data channel; and return a newest version number of entertainment interaction information to the user terminal via the data channel in response to the version acquisition request.

11. The device according to claim 10, wherein the instructions further cause the processor to:
provide entertainment interaction information in a webpage form to the user terminal via the data channel.

12. The device according to claim 10, wherein the instructions further cause the processor to:
receive an information acquisition request sent by the user terminal via the data channel and provide entertainment interaction information to the user terminal based on the information acquisition request; or
push the entertainment interaction information to the user terminal via the data channel.

* * * * *